United States Patent

[11] 3,587,375

[72] Inventor Carl Thumim
 Margate City, N.J.
[21] Appl. No. 790,794
[22] Filed Jan. 13, 1969
[45] Patented June 28, 1971
[73] Assignee North American Rockwell Corporation
 Pittsburgh, Pa.

[54] SYSTEMS FOR MARKING A MAGNETIC TAPE WITH A REPETITIVE PATTERN
15 Claims, 7 Drawing Figs.

[52] U.S. Cl. .................................................. 83/71,
 214/1.6, 340/174.1
[51] Int. Cl. .................................................. B26d 5/36
[50] Field of Search .................................... 83/71;
 214/1.6; 340/174.1 (1)

[56] References Cited
UNITED STATES PATENTS
3,229,127 1/1966 Thumim .................... 83/71X 3,245,556 4/1966 Thumim ..................... 83/71X
3,345,623 10/1967 Jackson ...................... 83/71X
3,402,350 9/1968 Shellabarger ............... 340/174.1X Primary Examiner—William S. Lawson
Attorneys—John R. Bronaugh, Floyd S. Levison, E. Dennis O'Connor and Richard A. Speer ABSTRACT: A system for marking a magnetic tape with a repetitive pattern of marks is disclosed, which system is particularly useful in a paper-cutting machine of the type which employs a back gauge movable along a worktable to position a load of paper or the like with respect to a reciprocating guillotine-type knife blade. The system includes a recording head, and a reading head spaced therebehind by a predetermined distance which corresponds to a desired spacing of the marks of the repetitive pattern of marks on the tape. The recording head places a first mark on the tape. Thereafter, when the reading head senses the presence of the mark, it energizes the recording head, now further downstream on the tape, to place a second mark on the tape. This "leapfrog" action continues until the repetitive pattern is complete.

PATENTED JUN 28 1971 3,587,375
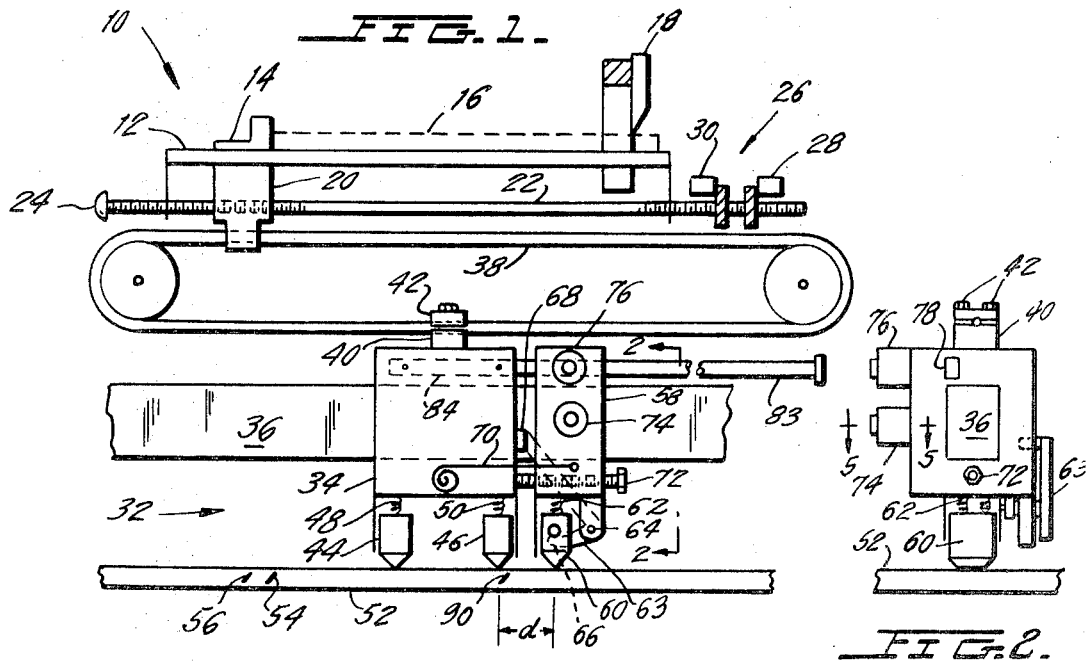
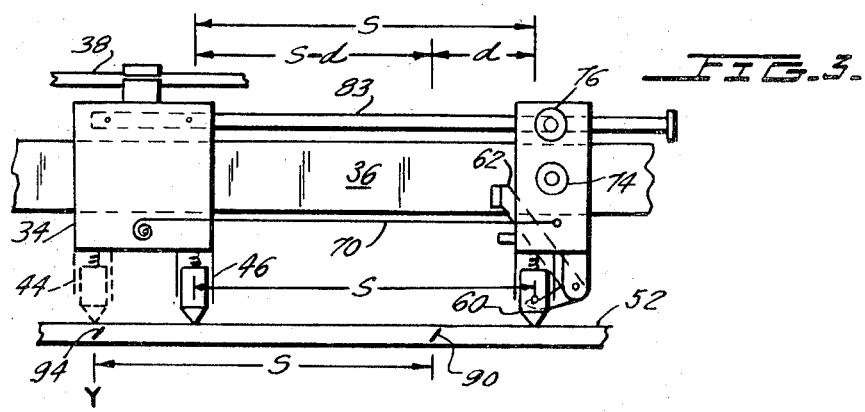
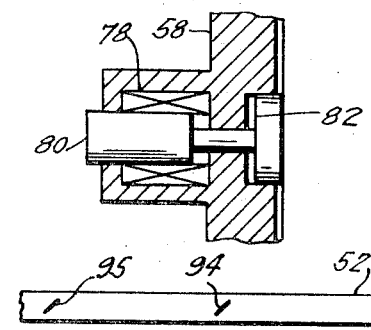
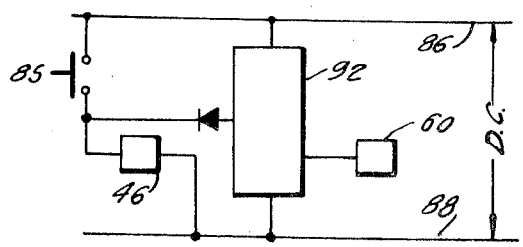
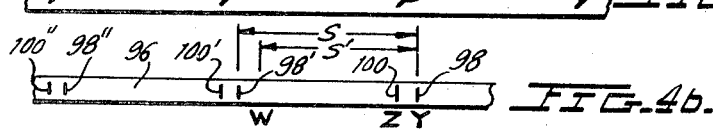
INVENTOR.
CARL THUMIM
BY
OSTROLENK, FABER, GERB & SOFFEN
ATTORNEYS

SYSTEMS FOR MARKING A MAGNETIC TAPE WITH A REPETITIVE PATTERN

This invention relates to paper cutters which employ a movable back gauge to position accurately a pile of paper or the like with respect to a guillotine-type blade; and more particularly relates to a system for marking a readable apparatus which is used to control the movement of such back gauge with a repetitive pattern of marks representative of a repeating program of cuts.

A typical paper cutter of the prior art, and one with which the present invention is intended to cooperate, includes a worktable along which a back gauge moves to position accurately a pile of paper or the like with respect to a guillotine type of knife blade located near the front of the table. The paper cutter includes a motor means for driving the back guage and a control system for stopping and starting the back gauge at a plurality of positions at which the paper will be properly located to be cut by the blade.

A common control system used today is a magnetic tape control system which includes a magnetic tape and at least one reading head. One of these two components is movable with respect to the other and is movable correspondingly with, e.g., over the same distance or in proportion to the same distance, as is travelled by the back gauge so that the reading head sequentially detects the presence of each of a plurality of marks previously recorded on the tape in accordance with the desired cutting program. Frequently, the control system includes two reading heads, the first head for signalling the back gauge to slow when a mark is detected, and the second head for signalling the back gauge to stop when the same mark is detected. This procedure avoids overtravel of the workpiece due to momentum gathered at high-speed back gauge travel.

It is customary for the heads of such tape control systems to perform the dual functions of sensing the presence of marks on the control tape during a cutting run, and recording the cutting program on the tape. Thus, beginning with a clean tape channel, the back gauge is moved to its rearmost or start position on the worktable. A switch is then actuated to cause the magnetic mark recording head to record a mark on the tape. Subsequently, the back gauge is moved forward or downstream to its next cutting position, and is stopped. Another mark is recorded on the tape. This procedure continues for the entire length of the worktable, with the back gauge being stopped and a mark being recorded on the tape at each of the cutting positions at which the back gauge is to stop automatically, or slow and stop, during the actual cutting operation. See, U.S. application Ser. No. 746,508, filed July 22, 1968, by Carl Thumim, entitled "Magnetic Tape Reversing System," and assigned to the assignee hereof.

Many times, the cutting program to be recorded on the tape is a repetitive pattern where the paper is to be cut into many equal length segments. In this situation the marks of the tape are equally spaced. Where the marks are equally spaced, and especially where the spacing between adjacent marks is very small, considerable downtime for the paper-cutting machine is required to record the program by manually moving the back gauge to each of its cutting positions and then putting a mark on the tape. In addition, there is a possibility that the operator will introduce error into the cutting program by inaccurately positioning the back gauge forward of a previously recorded cutting position as he records the repetitive program.

The instant invention provides a system for marking a control tape with repetitive patterns of marks, which system requires manual operation to record only one pattern of magnetic marks and further requires the operator to measure physically the preselected distance between adjacent patterns only once. Thereafter, the remaining magnetic marks are automatically recorded with equidistant spacing between adjacent patterns.

As will be shown in greater detail, the repetitive marking system of the instant invention includes a recording head, which might double as a reading head during subsequent passes through the cutting program. When the recording head is energized, it places a first mark on the control tape. The system also includes a reading head manually positioned behind the recording head by a predetermined distance which corresponds to the desired spacing of the marks in successive patterns on the tape. Once the first mark has been made, both heads are caused to travel forward with respect to the tape. The back gauge correspondingly travels forward. When the reading head detects the previously recorded first mark, it directs the recording head, now further forward, to record a second mark. Subsequently, when the heads continue forward and the reading head senses the second mark, it again directs the recording head, now further forward, to record a third mark. This "leapfrog" type action continues until recording of all the repetitive patterns has been completed. As will be shown, any pattern including a repetitive trim-out pattern can be easily and automatically repetitively recorded on a tape using the system of the instant invention.

While the preceding general description and the subsequent detailed description are concerned with a tape control system, other programable instruction holding means, including drums and discs, may be used to hold a series of cutting program marks. Furthermore, while magnetic marks and magnetic mark recording and sensing apparatus are specifically considered, other types of marks, like punched holes, raised embossments or optically sensed marks, may be used in conjunction with appropriate apparatus for recording and sensing these marks.

Accordingly, it is an object of the instant invention to provide a system for marking a programable instruction holding means with repetitive patterns of marks.

It is another object of the instant invention to speed the recording of repetitive patterns of marks on a programable instruction holding means.

It is still another object of the instant invention to provide such a repetitive marking system which requires the manual application of only one pattern of marks to a programable instruction holding means to initiate the automatic recording of subsequent repetitive patterns of marks.

It is a further object of the instant invention to minimize human participation and error in the recording of repetitive patterns of marks on a programable instruction holding means.

It is another object of the instant invention to provide such a system for marking a programable instruction holding means with repetitive patterns of marks, which system is particularly useful in a paper cutter of the type which employs a back gauge movable along a worktable to position a load of paper or other material beneath a guillotine type of cutting blade.

It is yet another object of the instant invention to provide such a system for marking a programable instruction holding means with repetitive patterns of marks, which system includes a recording head for placing a first mark on the instruction-holding means and a reading head located behind the recording head by a predetermined distance which corresponds to the spacing of the marks between adjacent repetitive patterns, which reading head causes the recording head to place another mark on the instruction-holding means when the reading head detects the presence of a previously recorded mark.

Yet another object of the instant invention is to provide such a repetitive marking system which is particularly useful in a guillotine type of paper-cutting machine which includes a back gauge movable from the rear toward the cutting blade thereof, and wherein the cutting program to be performed on the load of paper or other material is to include a plurality of equally spaced cuts.

It is a further object of the present invention to realize each of the foregoing objects where the programable instruction holding means comprises an elongated tape.

It is another object of the present invention to realize each of the foregoing objects where the programable instruction holding mean comprises an elongated magnetic tape and the recording an dreading apparatus for the recorded marks are magnetic apparatus.

These and other objects of the instant invention may be realized with an apparatus such as that considered in conjunction with the following description and drawings, in which:

FIG. 1 is a partially schematic showing of a paper cutter in which the instant invention is intended to operate, and also illustrates in a somewhat enlarged form, relative to the paper-cutting machine, the repetitive marking system of the instant invention;

FIG. 2 is a view taken along the arrows 2-2 of FIG. 1 of the program-recording and sensing apparatus;

FIG. 3 is a view illustrating the repetitive marking system of the instant invention as it is intended to be set up to perform a repetitive recording operation;

FIG. 4a is a schematic illustration of the magnetic tape used in FIG. 3 with a simple repetitive pattern recorded on it;

FIG. 4b is a schematic illustration of a magnetic tape which has been marked with a more complex repetitive trim-out pattern useful in a guillotine type of paper-cutting machine;

FIG. 5 is a view taken along the arrows 5-5 of FIG. 2; and

FIG. 6 is a schematic circuit diagram illustrating the electrical operation of the repetitive marking system of the instant invention.

Turning to FIG. 1, there is shown a guillotine type of paper cutter 10 which includes a worktable 12 along the upper surface of which is movable a back gauge 14 to position a load of paper or other material 16 with respect to a guillotine-type reciprocating knife blade 18 positioned near the front of table 12. As is customary in the art, the back gauge 14 includes a depending portion 20 which passes through a slot (not shown) provided in the worktable. A lead screw 22 threadedly passes through depending portion 20 such that rotation of lead screw 22 brings about movement of the back gauge 14. As is customary, lead screw 22 may be rotated by means of a handwheel 24 or by means of a driving system 26 which includes a high-speed motor 28 and a low-speed motor 30 (and appropriate pulleys) either of which can be operatively connected, by way of a clutch for example, to the lead screw 22 in accordance with the desired speed of the back gauge 14.

As is also conventional in the art, a magnetic tape control system 32 is provided to stop and start back gauge 14 in accordance with the desired cutting program which is to be performed on load 16 as it passes under guillotine blade 18. Control system 32 includes a carriage 34 slidably mounted on a guide bar 36 and connected for corresponding, e.g., equal or proportional, movement with the back gauge 14 by way of the continuous cable loop 38 which is secured to the depending protrusion 20, and to the carriage 34 by way of the clamp 40, 42. In the system illustrated, back gauge 14 moves to the right while carriage 34 moves correspondingly to the left.

Carriage 34 carries a pair of magnetic reading heads 44 and 46 which are biased by springs 48 and 50, respectively, into light contacting, cooperative relationship with respect to a magnetic tape having a magnetic mark receiving channel 52. Magnetic mark reading head 44 is designated the "slow" head while magnetic mark reading head 46 is designated the "stop" head for reasons to be soon apparent. For the sake of illustration, it will be assumed that magnetic tape channel 52 has a program of marks 54 and 56 recorded on it.

In operation, back gauge 14 is driven forward, i.e., to the right in FIG. 1, at high speed. In step with it, travels carriage 34. When the mark 54 is detected by the leftward moving "slow" head 44, suitable control circuitry (not shown, but conventional in the art) is energized to throw the back gauge into the "slow" speed. Finally, when the mark 54 is detected by "stop" head 46, appropriate circuitry (not shown, but conventional in the art) is energized to stop the back gauge at its first cutting position at which time the guillotine knife blade 18 operates to perform the cut. After the cut is performed both back gauge 14 and carriage 34 move forward at high speed until the mark 56 is reached by the heads 44 and 46. The same sequence of slowing, stopping and cutting takes place. After a complete program has been run through, back gauge 14 and carriage 34 are returned to their respective rear or start positions. A new workload is placed in front of back gauge 14. At this point, either the same program on the same tape channel is repeated or a different tape channel, bearing a different program is manually or automatically indexed into proper position with respect to the carriage 34.

Head 46 may also function as a recording head to mark the program initially on a blank tape channel as has been previously described.

Up to this point, everything that has been described is known in the prior art. See U.S. application Ser. No. 746,508, filed July 22, 1968, by Carl Thumim, entitled "Magnetic Tape Reversing System," and assigned to the assignee hereof.

The present invention, however, is particularly applicable to record automatically repetitive marks or patterns of marks on tape 52 in FIG. 1, and to that end includes an auxiliary carriage 58 slidably mounted also on guide bar 36. Auxiliary carriage 58 carries its own mark-reading head 60 which is normally biased toward the tape 52 by spring 62, but which is maintained spaced from said tape, except when repetitive marking is to be performed, by means of a bellcrank lever 63 which is pivotally mounted on carriage 58 at 64. One end 66 of bellcrank lever 63 raises head 60 out of contact with tape 52 whenever the opposite end 68 of lever 63 is brought into engagement with the main carriage 34. A spiral coil spring 70 is provided to bias auxiliary carriage 58 toward main carriage 34.

Auxiliary carriage 58 threadedly carries an adjustable stop screw 72, which provides adjustment whereby the heads 46 and 60 can be spaced apart by an arbitrary, but preferably minimal distance $d$ (e.g., 1 inch) against the bias of spiral coil spring 70, for purposes to be further explained. The distance $d$ is the minimum spacing distance between heads 46 and 60. This distance need be adjusted only when new heads are installed to compensate for variations in the settings of the carriages and heads.

Auxiliary carriage 58 also carries a pair of identical clamping means 74 and 76, one of which is shown in detail in FIG. 5 as including an energizable coil 78, within which is movable an armature 80 one end of which carries a plunger 82 which engages guide bar 36 (with clamping means 74) or the connecting rod 83 (with clamping means 76) in a manner to be further described. Rod 83 is secured at one end 84 to the main carriage 34 and at the other end passes freely through the auxiliary carriage 58, except when clamped thereto by the clamping means 76.

To mark a repetitive pattern on the tape 52 the following steps are taken. First, back gauge 14 and carriage 34 are moved to the respective start positions for the repetitive pattern, i.e., back gauge 14 to the left which brings carriage 34 to the right, in FIG. 1.

Then, switch 85, of FIG. 6, is closed momentarily to place head 46 (which in addition to being the "stop" magnetic mark reading head during the cutting job is also the mark recording head in the initial set up) into the circuit between the DC lines 86 and 88 of FIG. 6. The energization of recording head 46 causes mark 90 to be placed on tape 52, as illustrated in FIG. 1.

Next, solenoid-operated clamping device 74 is operated to lock the auxiliary carriage 58 to the guide bar 36.

Then main carriage 34, which is connected with the back gauge, is moved forward (left) by a distance $S-d$ in FIG. 3, such that the total distance between the magnetic mark recording gaps of heads 46 and 60 is S, which is the desired spacing between corresponding magnetic marks in each of the repetitive patterns on the tape channel. S can never be smaller than $d$, since $d$ is the minimum spacing between the gaps of heads 46 and 60. Movement OF CARRIAGE 34 TO THE LEFT RELATIVE TO CARRIAGE 58 ALSO RELEASES LEVER 68 PERMITTING HEAD 60 TO MOVE TO ITS OPERATIVE POSITION IN CONTACT WITH TAPE 52 UNDER THE INFLUENCE OF SPRING 62. Now, solenoid operated clamp 76 is energized to lock auxiliary carriage 58 to rod 83 at the predetermined distance S from main carriage 34, and immediately thereafter clamp 74 is deenergized to free auxiliary carriage 58 from guide bar 36.

Back gauge 14 and carriage 34 are now set in forward motion. Carriage 58 is drawn, by rod 83, along with carriage 34. Then, head 60 on auxiliary carriage 58 passes and detects previously recorded mark 90. With reference to FIG. 6, when head 60 detects mark 90, this generates a pulse, which is amplified by amplifier 92, to energize mark recording head 46. At this time, the recording head 46 is downstream at the location Y (in FIG. 3), which location is the distance S forward of the previously recorded mark 90. Thus, a perfectly located mark 94 will be recorded on tape 52. Without stopping, back gauge 14 and carriages 34 and 58 continue. The head 60 next detects the presence of mark 94 which again energizes recording head 46, now still further downstream, to record the next mark in the repetitive pattern at the proper location. This "leapfrog" action continues until the complete repetitive pattern has been automatically marked.

Refer to FIG. 4a which shows part of tape 52 after the pattern has been recorded on it. The pattern shown is simple and consists of single marks 90, 94, 95, 95', etc. which are equally spaced the distance S apart along tape 52.

When the repetitive pattern is completely recorded, solenoid-operated clamp 76 is deenergized, and spiral coil spring 70 moves auxiliary carriage 58 into engagement with the rear of main carriage 34, at which time the pivoting bellcrank lever 63 raises the reading head 60 out of contact with the tape to reduce wearing of the tape.

FIG. 4b illustrates a tape 96 which has been marked with repetitive patterns of trim-out cuts 98, 100; 98', 100'; and 98'', 100''. The same mechanism that produced the pattern of FIG. 4a will produce the patterns of FIG. 4b with only a slight difference in the operations. When the heads are at their spacing d of FIG. 1, a first mark 98 is recorded by momentary actuation of switch 85 with head 46 manually set at the initial "-cut" position Y. Then, with clamping means 74 locked, head 46 is manually moved relative to head 60 to the trim position Z and a second mark 100 is recorded by actuation of switch 85. Then head 46 is again moved relative to head 60 to position W which is over the distance S', i.e., S (which is the distance between marks 98 and 98') −d. Clamping means 76 is then locked and clamping means 74 unlocked.

Now, carriages 58 and 34 are moved forward as an integral unit until head 60 detects mark 98 in FIG. 4b. This energizes the now downstream recording head 46 to record mark 98' on tape 96. When head 60 later senses mark 100, this energizes head 46 to record mark 100' on tape 96. As carriages 34 and 58 continue forward, the trim-out pattern will next comprise marks 98'' and 100'' and will be repeated in the "leapfrog" method described previously. It is to be understood from the above two examples that virtually limitless types of patterns can be marked on the tape 96 in the simple and automatic method of the instant invention so long as the pattern is repetitive. A pattern need be set up manually the first time only.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim:

1. A system for marking a programable instruction holding means with a repetitive pattern of control marks, said system comprising,
   a programable instruction holding means;
   a mark-recording head means positioned adjacent said programable instruction holding means and movable in reference to it;
   first means for energizing said recording head means to record a first mark at a preselected location on said programable instruction holding means;
   mark-reading head means positioned adjacent said programable instruction holding means;
   spacing means joining said recording head means and said reading head means for spacing said reading head means a variable preselected distance behind said recording head means as the latter moves in reference to said programable instruction holding means, whereby both said means move in unison;
   means for releasing said spacing means from holding said head means one preselected distance apart; adjustment means for adjusting the distance apart of said head means; means for resecuring said spacing means;
   motor means for moving both said mark-recording head means and said mark reading head means in reference to said programable instruction holding means; and
   second means for energizing said mark-recording head means to record a second mark on said instruction holding means when said mark-reading head means detects that it is passing said first mark.

2. The system of claim 1, wherein said programable instruction holding means is capable of having magnetic marks recorded on it;
   said mark-recording head means and said mark-reading head means respectively comprise magnetic mark recording and magnetic mark detecting devices; and
   said marks are magnetic marks.

3. The system of claim 2, wherein said programable instruction holding means comprises an elongated magnetic tape channel.

4. A system for marking a programable instruction holding means with a repetitive pattern of control marks, said system comprising,
   a programable instruction holding means;
   a mark-recording head means positioned adjacent said programable instruction holding means and movable in reference to it;
   first means for energizing said recording head means to record a first mark at a preselected location on said programable instruction holding means;
   mark-reading head means positioned adjacent said programable instruction holding means;
   spacing means joining said recording head means and said reading head means for spacing said reading head means a predetermined distance behind said recording head means as the latter moves in reference to said programable instruction holding means;
   motor means for moving both said mark-recording head means and said mark-reading head means in reference to said programable instruction holding means;
   second means for energizing said mark-recording head means to record a second mark on said instruction-holding means when said mark-reading head means detects that it is passing said first mark;
   said recording head means is carried by a first carriage longitudinally movable along a guide bar; and
   wherein said reading head means is carried by a second carriage longitudinally movable along said guide bar.

5. The system of claim 4, further including biasing means for urging said second carriage toward said first carriage;
   raising means for raising said reading head means away from said instruction-holding means when said second carriage is in engagement with said first carriage under the force of said biasing means.

6. The system of claim 4, further including adjustable stop means cooperating with said first and second carriages for locating said reading head means a small distance, less than said predetermined distance, behind said recording head means.

7. The system of claim 6, wherein said stop means includes a threadedly adjustable rod passing through one of said first and second carriages and into engagement with the other of said first and second carriages.

8. The system of claim 6, further including normally nonenergized holding means for maintaining said reading head means at its position a small distance behind said recording head means such that said first carriage can be moved along said guide bar independently of said second carriage to obtain proper initial spacing between said carriages.

9. The system of claim 8, wherein said normally nonenergized holding means includes:
an electrically energizable coil carried by said second carriage;
an armature movable between a first and second position when said coil is energized; and
a plunger secured to said armature;
said plunger moving into engagement with said guide bar to clamp said second carriage at its said position when said armature moves from its first to its second position.

10. The system of claim 8, wherein said spacing means is connected between said first and second carriages for maintaining said first and second carriages such a distance apart that said recording and said reading head means remain said predetermined distance apart, and they move as one unit along said guide bar once said holding means is deenergized.

11. The system of claim 10, wherein said selectively operable securing means includes:
a securing rod, one end of which is rigidly secured to one of said first and second carriages, the other end of which is slidably positioned relative to the other end of said first and second carriages; and
clamping means selectively operable for clamping said other of said carriages to said other end of said rod.

12. The system of claim 11, wherein said clamping means includes:
an electrically energizable coil carried by said second carriage;
an armature movable between a first and second position when said coil is energized; and
a plunger secured to said armature;
said plunger moving into engagement with said other end of said rod to rigidly interconnect said second carriage and said rod when said armature moves from its first to its second position.

13. A paper-cutting machine comprising:
a worktable;
a back gauge movable along said worktable to position a load with respect to a knife reciprocatingly positioned above said worktable;
driving means for advancing said back gauge along said table;
a magnetic tape capable of storing a plurality of magnetic marks thereon representative of the cutting positions of a desired cutting program to be performed on said load;
control means for detecting the presence of said marks and for stopping said back gauge at each cutting position of said cutting program; and
a system for marking said magnetic tape with a repetitive pattern of marks; said system comprising:
magnetic mark recording head means positioned adjacent said tape and movable along the length thereof correspondingly to movement of said back gauge along said worktable;
first means for energizing said magnetic recording head means to record a first mark on said tape at a preselected location;
magnetic mark reading head means positioned adjacent said tape and movable along the length thereof;
spacing means joining said recording head means and said reading head means for spacing said reading head means at a predetermined distance behind said recording head means as the latter moves along said tape;
motor means for moving both said recording and said reading head means along said tape correspondingly to movement of said back gauge; and
second means for energizing said magnetic recording head means to place a second mark on said tape when said reading head means detects that it is passing said first mark.

14. The paper-cutting machine of claim 13, further including a guide bar;
a first carriage for carrying said recording head means longitudinally along said guide bar;
a second carriage for carrying said reading head means;
adjustable stop means cooperating with said first and second carriages for locating said reading head means a small distance, less than said predetermined distance, behind said recording head means.

15. The paper-cutting machine of claim 14, further including normally nonenergized holding means for maintaining said reading head means at its position a small distance behind said recording head means such that said first carriage can be moved along said guide bar independently of said second carriage to obtain proper initial spacing between said carriages; and
wherein said spacing means is connected between said first and second carriages for maintaining them such a distance apart that said recording and said reading head means remain said predetermined distance apart, whereby they may move as one unit along said guide bar once said holding means is deenergized.